April 24, 1945.  A. W. GAUBATZ  2,374,342
FAN
Filed Aug. 29, 1941

Inventor
Arthur W. Gaubatz
By Blackmore, Spencer & Flint
Attorneys

Patented Apr. 24, 1945

2,374,342

UNITED STATES PATENT OFFICE 2,374,342

FAN

Arthur W. Gaubatz, Indianapolis, Ind., assignor to General Motors Corporation, Detroit, Mich., a corporation of Delaware Application August 29, 1941, Serial No. 408,746

5 Claims. (Cl. 170—160)

This invention has to do with screw propellers and, particularly, with automotive vehicle propelling engine cooling fans whose blades decrease in pitch as the speed of the fan increases.

More specifically, the invention has to do with fans of the type disclosed in the Smith Patent No. 2,132,133 which was issued on October 4, 1938, and has for its principal objects to eliminate the friction in the hinges and thus obviate the resulting irregularities in operation and to simplify the construction and reduce the cost of fans of this type.

For a better understanding of the nature and objects of this invention, reference is made to the following specification wherein there is described the preferred embodiment of the invention which is illustrated in the accompanying drawing.

Figure 2:
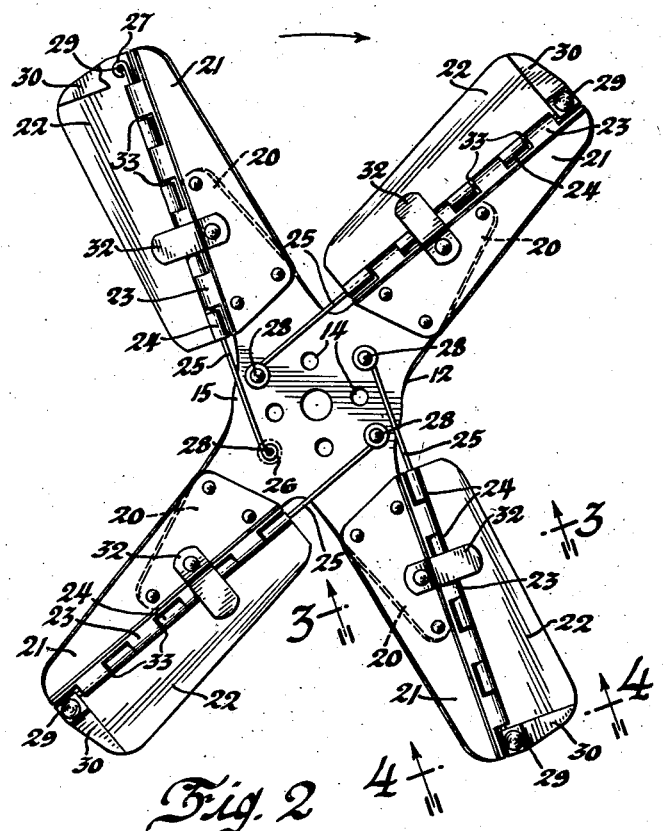
Figure 2 is enlarged front elevation of the fan shown in Figure 1.
Figure 1:
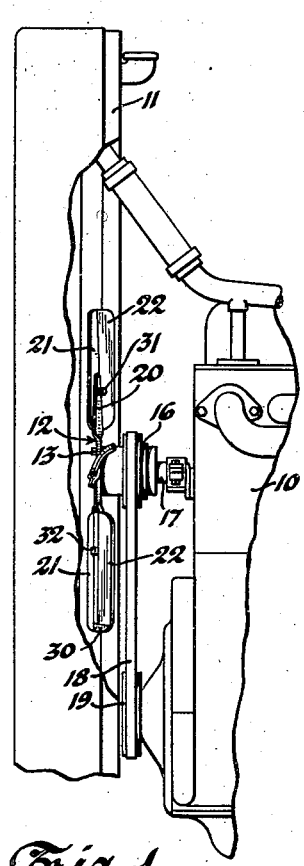
Figure 1 shows a fan in accordance with my invention installed on the propelling engine of an automotive vehicle.
Figure 3:
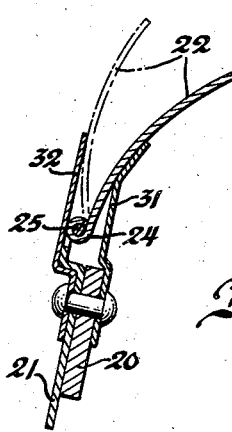
Figures 4, 5, 6:
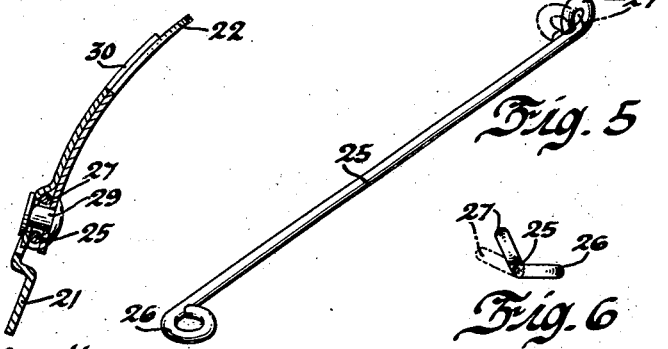

Figures 3 and 4 are enlarged sections taken, respectively, on the line 3—3 and the line 4—4 of Figure 2.

Figure 5 is an enlarged perspective view of the pintle of one of the hinges of the fan shown in the preceding figures.

Figure 6 is an end elevation of the pintle shown in Figure 5.

In the drawing, the reference character 10 indicates the water-cooled propelling engine of an automotive vehicle and the reference character 11 the radiator by which the engine cooling water is cooled. The engine 10 is located in advance of the body of the vehicle and the radiator 11 in advance of the engine so that movement of the vehicle causes air to circulate through the radiator and over the engine. To supplement the volume of air which is circulated through the radiator and over the engine due to movement of the vehicle, particularly when the vehicle is moving slowly, there is provided between the radiator and the engine a screw fan 12. The fan 12 is secured by screws 13 which extend through openings 14 in its hub 15 to a pulley 16 which is mounted so that it may rotate on a shaft 17 which is carried by the engine. The fan is driven at a rate proportional to the speed of the engine in a direction to draw air through the radiator and propel it over the engine by a belt 18 which passes around the pulley 16 and a pulley 19 which is secured to the crankshaft of the engine.

On the hub 15 of the fan there are formed stub arms 20 which are twisted slightly at their junctions with the body of the hub so that their leading edges are located somewhat forward of their trailing edges. To each of the arms 20 there is secured a blade which consists of rigid and inflexible leading and trailing vanes 21 and 22. Each of the leading vanes 21 is riveted to an arm 20 of the hub 15 and is, consequently, disposed parallel thereto. The leading edge of each of the trailing vanes 22 is connected to the trailing edge of one of the leading vanes 21 by a hinge whose axis is inclined in the direction of rotation of the fan, e. g., at an angle of about fifteen degrees (15°) to the line radial to the axis of rotation of the fan which intersects the axis of the hinge at the same point as does the line normal to it which passes through the center of gravity of the trailing vane.

The eyes 23 and 24 of each hinge are integral with the vanes 21 and 22, respectively, and their axis is disposed forward of the bodies of the vanes. The pintle 25 of each hinge is a rod of spring steel which passes through the eyes 23 and 24 of the hinge and has on its inner end an eye 26 and on its outer end an eye 27. The inner end of the pintle is secured to the hub 15 of the fan by a rivet 28 which passes through the hub and the eye 26 and the outer end thereof is secured to the outer end of the trailing vane 22 by a rivet 29 which passes through the eye 27 and the vane and a strap 30 which is spot welded to the vane to stiffen it.

The eyes 26 and 27 are disposed at such an angle to each other when the pintle is unstressed torsionally that they are stressed torsionally in the direction to bias the trailing vane in the direction to increase the pitch of the blade when they are disposed in the angular relation in which they are disposed when the eyes are secured to the hub and the trailing vane and the latter is at the limit of its movement in the direction to increase the pitch of the blade. This feature is illustrated in Figures 5 and 6 in which the angular relation of the eyes when the pintle is unstressed torsionally is indicated by the solid line position of the eye 27 and the angular relation of the eyes when the trailing vane is at the limit of its movement in the direction to increase the pitch of the blade is indicated by the dash-and-dot line position of the eye 27. Movement of the trailing vane in the direction in which it is biased by the pintle 25 and in the opposite direction is limited by stops 31 and 32 which are riveted to the stub arm 20 and the leading vane 22. When the trailing vane is in engagement with the stop 31, as it is when the fan is at rest, its trailing edge is located to the rear of the plane of rotation of the leading vane and its center of gravity is located to the rear of the axis of the hinge which connects it to the leading vane.

The fan 12 is secured to the pulley 16 with the trailing edges of the trailing vanes 22 extending away from the radiator 11 and toward the engine 10. When the fan is installed in this manner and the engine is operating, the fan is rotated at a speed proportional to the speed of the engine in the direction indicated by the arrow in Figure 2 and, consequently, draws air through the radiator and propels it over the engine. As the speed of the engine increases, the trailing vanes swing from the positions in which they are shown in solid lines toward the positions in which they are shown in dash-and-dot lines in Figure 3 and the pitch of the blades of the fan is, consequently, reduced. The result of this is that the rate at which the fan 12 delivers air does not increase in proportion to its rate of rotation and, consequently, if the fan is designed so that it will deliver air at the same rate as a fan of conventional design at relatively low speeds, it will deliver less air and, consequently, consume less power and create less noise than the latter at higher speeds. This characteristic of my fan renders it peculiarly suited for use as an engine cooling fan in automotive vehicles of conventional design in which the circulation of air due to the movement of the vehicle does not satisfy the engine cooling air requirements while the vehicle is moving relatively slowly, but more and more nearly satisfies it as the speed of the vehicle increases.

Two forces, viz., centrifugal force and the resistance of the atmosphere to the passage of the blades through it, tend at all times while the fan is operating to reduce the pitch of the blades. The modus operandi of the air resistance requires no explanation. Centrifugal force is effective at all times because the axes of the hinges are not inclined oppositely to the direction of rotation of the fan and, therefore, all movements of the trailing vanes from the solid toward the dash-and-dot line positions in which they are shown in Figure 3 are accompanied by movements of the centers of gravity of the trailing vanes away from the axis of rotation of the fan and vice versa. However, the angle at which the hinges are inclined in the direction of rotation of the fan is so large that centrifugal force and the spring action of the pintles 25 are the dominant factors in effecting movement of the trailing vanes and determining the pitch of the blades at different speeds of rotation of the fan.

Sufficient endwise clearance which is indicated by the reference character 33 in the drawing is provided between the inner ends of the eyes 23 and the outer ends of the eyes 24 of the hinges which connect the leading and trailing vanes of the blades that the centrifugal force which tends to displace the trailing vanes radially with respect to the leading vanes during operation of the fan is taken entirely by the pintles 25 at all speeds of operation of the fan. Thus friction in the hinges is largely eliminated and the resulting irregularity in operation obviated.

As I have indicated, the pintles 25 are preferably made of spring steel. The other parts of the fan may be made of the material of which automotive vehicle propelling engine cooling fans are usually made, viz., steel, or any other suitable material but to reduce the tensile load imposed by centrifugal force on the pintles I prefer to make the trailing vanes of a light metal, such as aluminum, an aluminum base alloy, magnesium or a magnesium base alloy.

I claim:

1. In a screw propeller, a vane hinged so that it may swing, and means to resist the force which tends to move the vane lengthwise of the axis of the hinge about which the vane swings and to resist yieldingly swinging movement of the vane about the axis of the hinge about which it swings including a torsion spring which extends lengthwise of the axis of the hinge about which the vane swings and is fixed to the vane and to a part of the propeller with respect to which the vane swings.

2. In a screw propeller, a rotatable hub, an arm which is connected to and extends away from the hub at an angle to the axis of rotation of the hub, a vane, a hinge which connects the vane to the arm so that it may swing about an axis which extends lengthwise of the arm including aligned eyes on the arm and the vane and a pintle which extends through the eyes and is fixed to the vane and to a part of the propeller with respect to which the vane swings so that it resists the centrifugal force which tends to move the vane lengthwise of the axis of the hinge about which the vane swings and yieldingly resists movement of the vane about the axis of the hinge about which the vane swings.

3. In a screw propeller, a rotatable hub, an arm which is connected to and extends away from the hub at an angle to the axis of rotation of the hub, a vane, a hinge which connects the vane to the arm so that it may swing about an axis which extends lengthwise of the arm and is inclined in the direction of rotation of the propeller including aligned eyes on the arm and the vane and a pintle which extends through the eyes and is fixed to the outer end of the vane and the hub so that it resists the centrifugal force which tends to move the vane lengthwise of the axis of the hinge about which the vane swings and yieldingly biases the vane to a position in which it is disposed at an angle to the path in which the arm travels.

4. In a screw propeller, a rotatable hub, an arm which is connected to and extends away from the hub at an angle to the axis of rotation of the hub, a vane of an aluminum base alloy, a hinge which connects the vane to the arm so that it may swing about an axis which extends lengthwise of the arm and is inclined in the direction of rotation of the propeller including aligned eyes on the arm and the vane and a pintle which extends through the eyes and is fixed to the outer end of the vane and the hub so that it resists the centrifugal force which tends to move the vane lengthwise of the axis of the hinge about which the vane swings and yieldingly biases the vane to a position in which it is disposed at an angle to the path in which the arm travels.

5. In a screw propeller, a rotatable hub, an arm which is connected to and extends away from the hub at an angle to the axis of rotation of the hub, a vane of an aluminum base alloy, a hinge which connects the vane to the arm so that it may swing about an axis which extends lengthwise of the arm and is inclined in the direction of rotation of the propeller including aligned eyes on the arm and the vane and a pintle which extends through the eyes and is fixed to the outer end of the vane and the hub so that it resists the centrifugal force which tends to move the vane lengthwise of the axis of the hinge about which the vane swings and yieldingly biases the vane to a position in which it is disposed at an angle to the path in which the arm travels, and means for limiting the swinging movement of the vane in both directions.

ARTHUR W. GAUBATZ.